(12) United States Patent
Clark

(10) Patent No.: US 6,227,487 B1
(45) Date of Patent: May 8, 2001

(54) AUGMENTED WING TIP DRAG FLAP

(75) Inventor: Walter Dennis Clark, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/305,538

(22) Filed: May 5, 1999

(51) Int. Cl.[7] ................................................. B64C 13/00
(52) U.S. Cl. ............................................................ 244/75 R
(58) Field of Search .................................... 244/213, 217, 244/113, 90 R, 90 A, 110 D

(56) References Cited

U.S. PATENT DOCUMENTS

| | | | | |
|---|---|---|---|---|
| 1,759,032 | * | 5/1930 | Bauer | 244/45 R |
| 1,798,913 | * | 3/1931 | Thurston | 244/210 |
| 1,803,498 | * | 5/1931 | Chilton | 244/90 R |
| 1,890,012 | * | 12/1932 | Alfaro | 244/215 |
| 1,947,461 | * | 2/1934 | De Port | 244/90 R |
| 1,989,291 | | 1/1935 | Prewitt | 244/29 |
| 2,210,642 | | 8/1940 | Thompson | 244/35 |
| 2,565,990 | * | 8/1951 | Richard | 244/90 R |
| 2,788,182 | * | 4/1957 | Brenden et al. | 244/48 |
| 2,846,165 | | 8/1958 | Axelson | 244/90 |
| 3,067,971 | | 12/1962 | Dew | 244/113 |
| 3,107,882 | * | 10/1963 | Matteson et al. | 244/7 C |
| 4,247,063 | | 1/1981 | Jenkins | 244/91 |
| 4,382,569 | | 5/1983 | Boppe et al. | 244/199 |
| 4,455,004 | * | 6/1984 | Whitaker, Sr. | 244/90 R |
| 4,545,552 | | 10/1985 | Welles | 244/90 R |
| 4,598,885 | | 7/1986 | Waitzman | 244/13 |
| 5,094,411 | * | 3/1992 | Rao | 244/214 |
| 5,156,358 | * | 10/1992 | Gerhardt | 244/36 |
| 5,192,037 | * | 3/1993 | Moorefield | 244/46 |
| 5,398,888 | * | 3/1995 | Gerhardt | 244/45 A |
| 5,707,029 | * | 1/1998 | McIntosh | 244/225 |
| 5,918,832 | * | 7/1999 | Zerweckh | 244/48 |
| 5,988,563 | * | 11/1999 | Allen | 244/49 |

* cited by examiner

*Primary Examiner*—Thomas Price
(74) *Attorney, Agent, or Firm*—Terry J. Anderson; Karl J. Hoch, Jr.

(57) ABSTRACT

Aerodynamic control apparatus which deflects a control-surface-member into the airstream for creating drag on an aircraft. This drag flap mechanism includes a strut and hinge plate which together constrain the control-surface-member to move in a coupled manner about mutually perpendicular axes. There is an actuator from the controls of the pilot which moves the hinge plate which in turn moves the control-surface-member in that coupled manner. It moves between a fully feathered position presenting minimal resistance to the airstream and a fully operative position presenting maximum resistance to the airstream. The preferred embodiment of the drag flap mechanism is as a continuation of the wing tips where two control-surface-members are hinged about a common axis on the hinge plate so they can open like a split flap. The motion of these two control-surface-members are constrained to allow the force of the air opening the two surfaces to assist in pushing the two surfaces more into the airstream. An alternate embodiment is a single flap that opens into the airstream from any surface on the aircraft but most usefully on the top surface of the wing inboard of the ailerons. Either embodiment can be used for both yaw control and for glide slope control as can many prior art drag flaps. The advantage of the present invention is with extremely large drag forces. The augmenting force is a function of the side slip angle and incorrect actuation (pilot error or hydraulic failure) will not be augmented. In fact without any actuation force, this invention can perform the same function as a large fixed vertical stabilizer and with more deflection on both sides, there is more stabilizing effect.

10 Claims, 10 Drawing Sheets

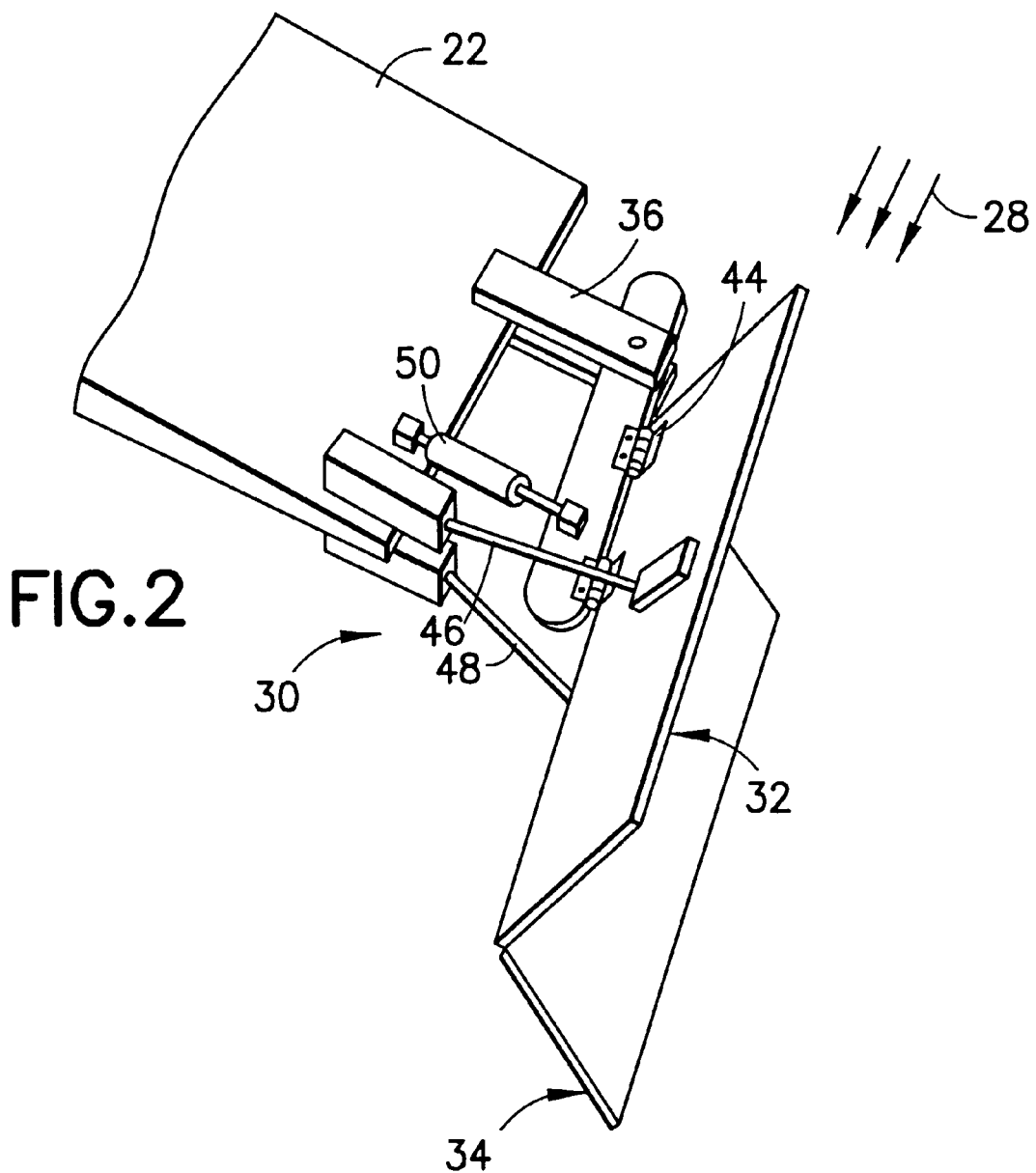

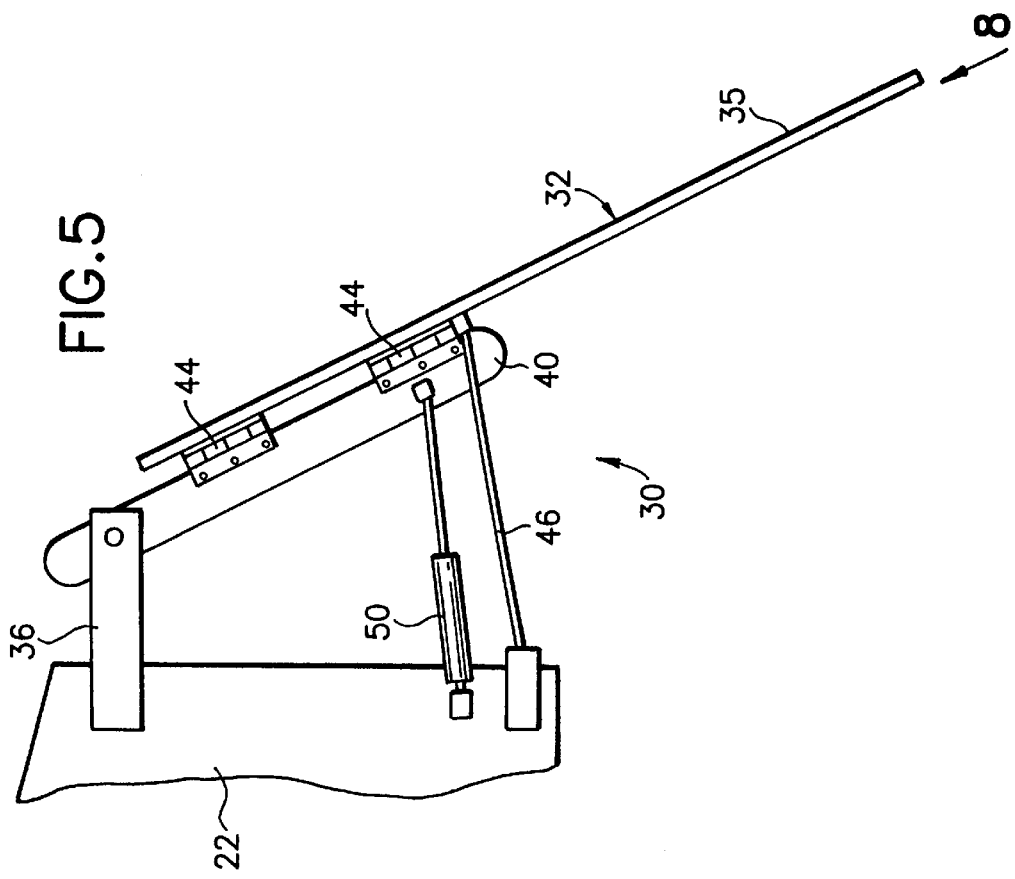
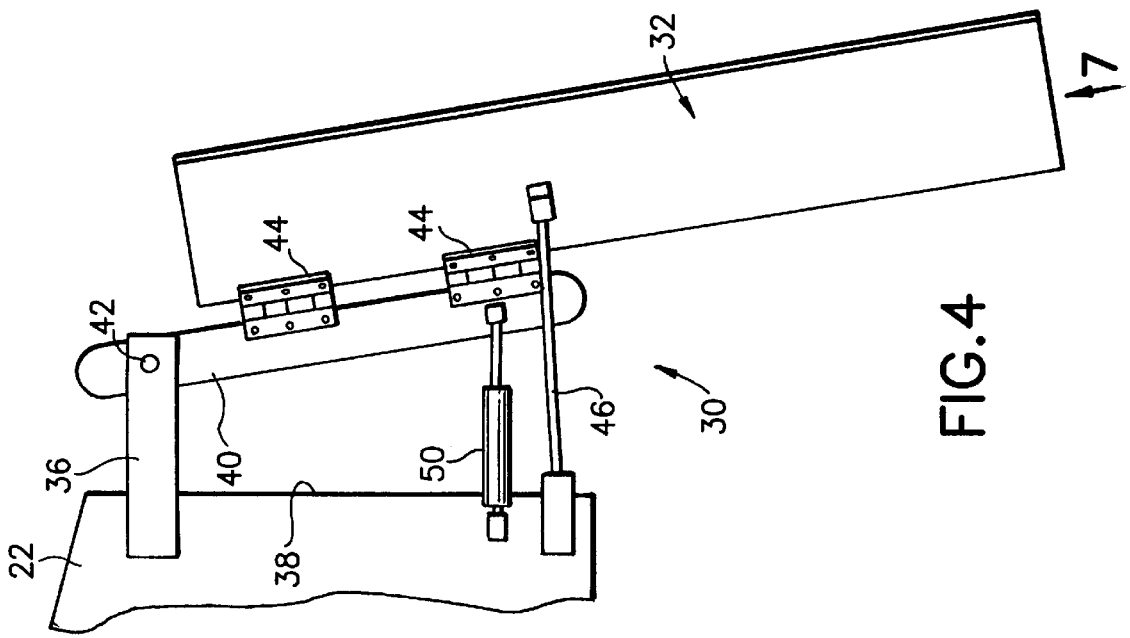

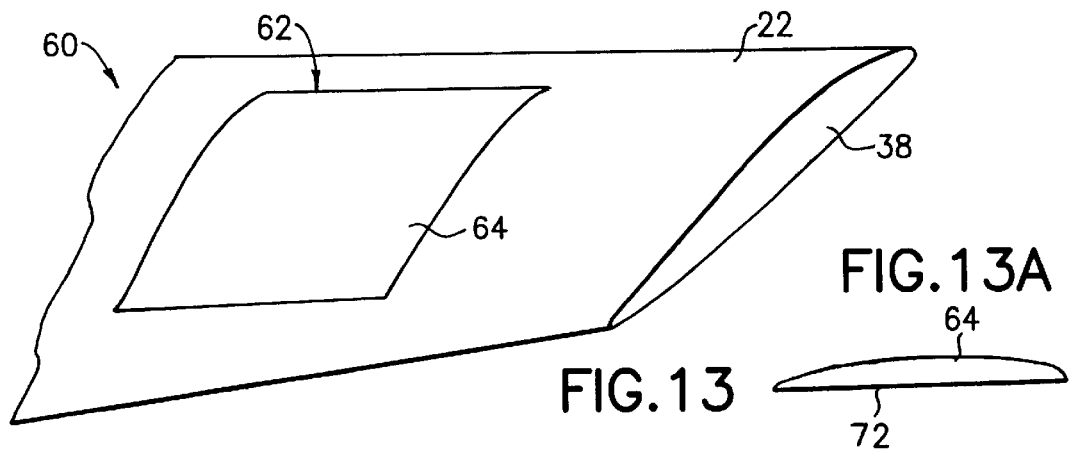
FIG. 13
FIG. 13A
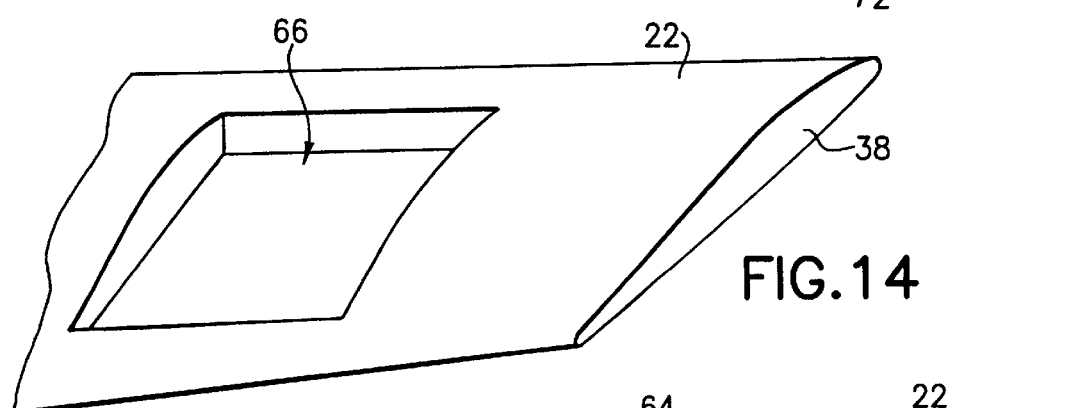
FIG. 14
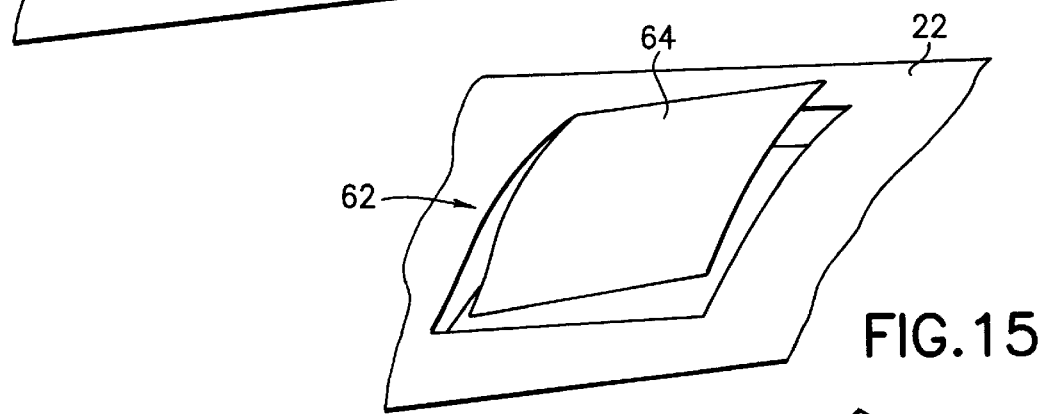
FIG. 15
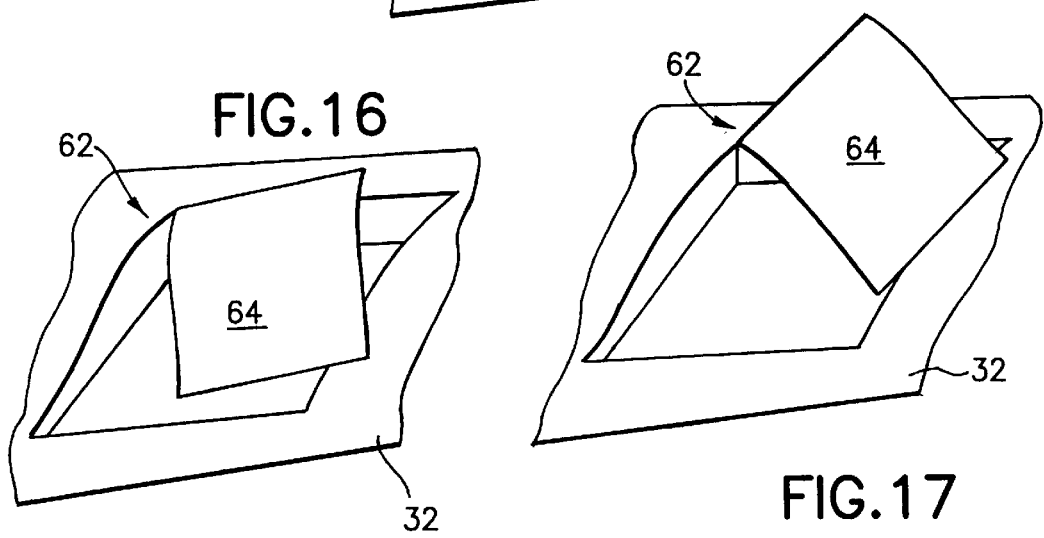
FIG. 16
FIG. 17

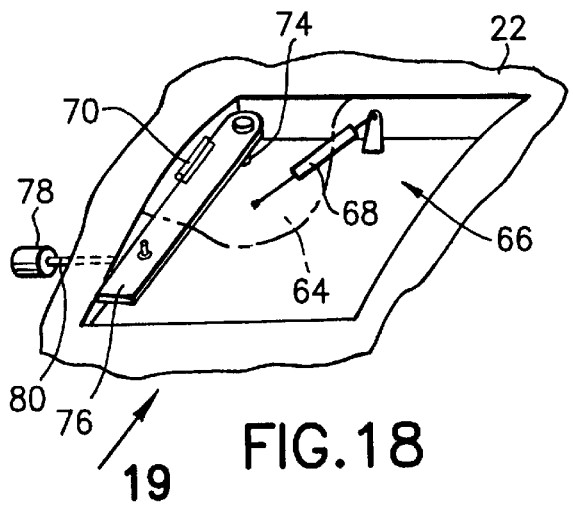
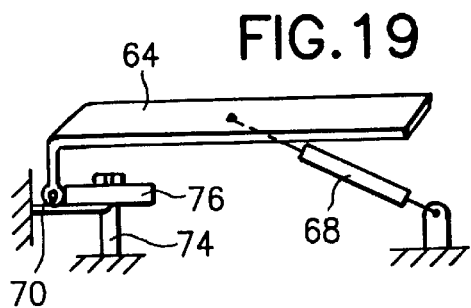
FIG.18
FIG.19
FIG.20
FIG.21
FIG.22
FIG.23
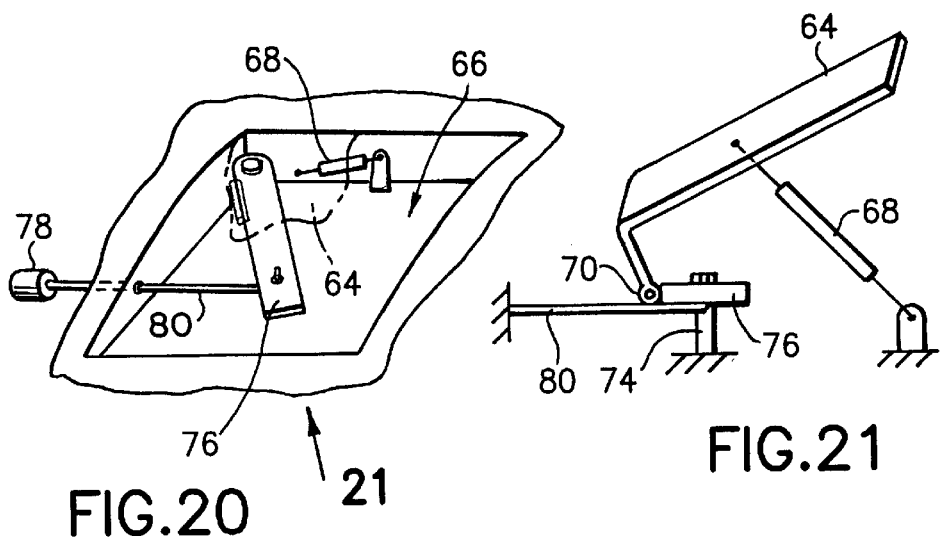
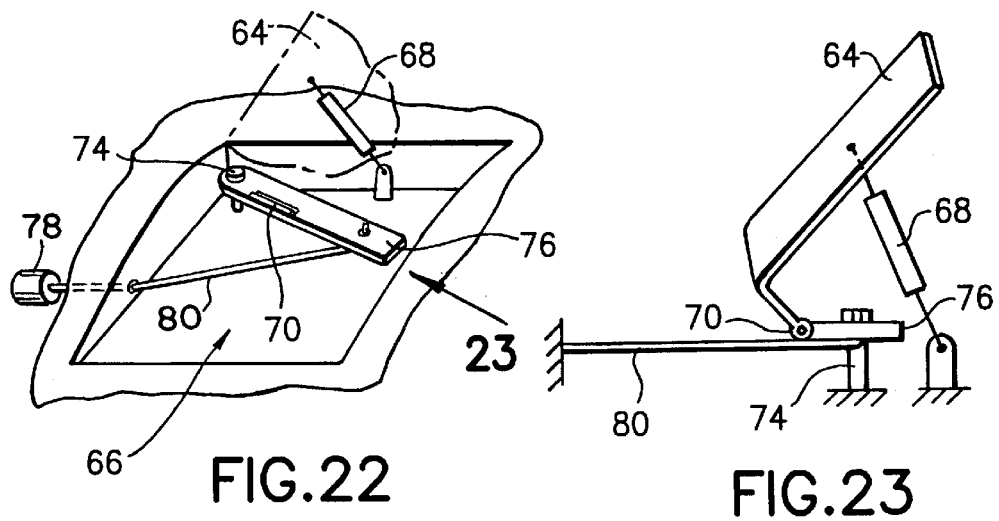

AUGMENTED WING TIP DRAG FLAP

BACKGROUND OF THE INVENTION

1. Field of the Invention

The present invention relates generally to aerodynamic control apparatus and, more particularly, such apparatus used in combination with a wing of an aircraft and, even more particularly, to the wing tip for producing yaw and drag forces.

2. Description of the Prior Art

Over the years, there have been numerous advances in the state of the art relating to aircraft control devices positioned at outboard ends of the wings. A number of patents can be referred to which are generally representative of such advances. For example, an early improvement is provided by U.S. Pat. No. 1,989,291 to Prewitt which discloses an airplane with floating ailerons for roll control encompassing the entire tips of the wings. U.S. Pat. No. 2,210,642 to Thompson discloses a flying wing with fixed stabilizing and control surfaces arranged at the opposite extremities of the wing structure to minimize the possibility of stalling. U.S. Pat. No. 2,846,165 to Axelson discloses an aircraft control system with vertically disposed airfoils at the tip ends of the wings and mounted to pivot about a vertical axis to affect roll and lift control and guard against aileron reversal at high speeds. U.S. Pat. No. 3,067,971 to Dew discloses peripherally disposed drag flaps of unconventional design at the rear of an aircraft or missile to decelerate the vehicle from very high velocities, as upon reentry from space. U.S. Pat. No. 4,247,063 to Jenkins discloses retractable wing-tip mounted vanes for providing both roll control and direct lift control. U.S. Pat. No. 4,382,569 to Boppe et al. discloses a capture device at the tip of a fluid foil such that when provided with relative motion with respect to the fluid in which it is immersed, it intercepts a quantity of the crossflow which is generated by the difference in pressure on the lower surface relative to the upper surface so that lift-induced drag is thereby reduced. U.S. Pat. No. 4,545,552 to Welles discloses an aircraft which utilizes controllable winglets to generate pitching, yawing and rolling moments in flying wing or tailless airframe configurations which are preferably of a swept forward style. U.S. Pat. No. 4,598,885 to Waitzman discloses an aircraft airframe having wings connected to the fuselage by spars of smaller cross section than the wings. Movable winglets may be provided at the outboard ends of the wings.

It was with knowledge of the foregoing state of the technology that the present invention has been conceived and is now reduced to practice.

SUMMARY OF THE INVENTION

The present invention relates to aerodynamic control apparatus for the wing of an aircraft comprising a drag flap mechanism including a control surface member pivotally mounted for coupled movement about mutually perpendicular axes parallel to roll and yaw axes between a fully feathered position presenting minimal resistance to the airstream and a fully operative position presenting maximum resistance to the airstream. There can be a second control surface for the underside of the wing, or two such control surfaces back to back can extend beyond the wing tip. In the last embodiment, the control surfaces are contiguous and opposed when the mechanism is in the feathered position and define between them an obtuse angle at the common axis when in the operative position. The control surface is constrained so as to move out into the airstream in such a way that the very drag force it produces assists the force to move it there. The constraint is by a pivoting hinge plate which holds the control surface on one edge and a transfer strut which goes between the wing and the control surface. An actuator may be provided for moving the control surface members between the feathered and operative positions. The drag flap mechanism may include a single control surface which is actuated by a pivoting hinge plate and transfer strut buried in the wing structure beneath the control surface. In another implementation a cantilevered bracket member fixed to the wing and extending beyond a tip end thereof and a hinge plate pivotally mounted on the bracket member at a location spaced from the tip end of the wing, the first and second control surface members being mutually hinged to the hinge plate for pivotal movement about the common axis. Also, the transfer struts are mounted to the wing at a location distant from the bracket member and each of the transfer struts is mounted to its associated control surface at a location spaced from the common axis.

In short, this invention is effective for creating drag anywhere on an aircraft but most usefully at the wing tips. In the low drag configuration, an airfoil embodying the invention is flat, or horizontal, and in the high drag configuration is upright and in the airstream. The unique idea here is the mechanism for moving between low and high drag.

As noted above, the transfer struts are pivotally mounted to, and extend between, the wing and an associated control surface member in such a manner that the control surface member is movable primarily about the first axis when in the fully feathered position and simultaneously about the first and second axes when the control surface is intermediate the feathered position and the fully operative position. Thus, the mechanism of the invention is moved from the low drag, closed position to the opened position. The transfer struts allow the force of the airstream that is opening the control surface to augment an actuator, if available, in pushing the control surfaces ever more into the airstream. With this construction, only a relatively small controlling force is required to actuate a large drag force. The key to the mechanism of the invention is the coupling of the force that wedges the control surface members open to push the surface out into the airstream. The transfer strut is located on the outside of the control surface member in the figures to show how it works. In practical application of this invention it would be located on the inside of, or between the opposed control surface members. This has the further advantage that the transfer strut would be in tension instead of compression, when the drag forces are great. What is critical is that the hinge force be balanced against the pivot force for as much of the motion as possible. By proper placement of the components of the invention, namely, the transfer struts, hinges, front pivot and control surface members, the forces can be balanced to any amount of augmentation including self opening, that is, where the relaxed state of the aerodynamic control apparatus is the fully deployed position and a control force must be exerted to close it.

In one of the embodiments of this invention, the augmented drag flap is deployed at the wing tips and actuated on one side or the other to effect a yaw force. If the wings are swept back, as in the B-2 bomber, for example, the resultant force vector is more orthogonal to the moment arm from the center of gravity of the vehicle. Two advantages are thereby effected. First, increased torque results from the same applied force. Second, and more significantly, the augmenting force diminishes as the direction of the airstream comes more in line with the aircraft. Since the side load component of the force diminishes automatically, less overshoot occurs when the correcting force is applied for too long a time.

If the force to open the control surface member and the force to swing it out across the airstream are sufficiently balanced, the mere presence of a skewed airstream is enough to open it. This is a passive mechanism which works in the correcting sense. That is, the side slip angle of the airstream opens the control surface member automatically thereby creating drag in the direction that will move the wing back to its original orientation. As the wing becomes more and more into alignment with its original orientation, the control surface member closes until it becomes completely closed when the wing returns to its original orientation. This automatically operating mechanism duplicates the passive action of a vertical stabilizer if the aircraft has no fuselage.

While the self opening feature of the invention may never replace vertical fins tails on an aircraft, it does demonstrate the effective, yet benign nature of the device. There is a safety advantage here when both tip drag devices are deployed to control a steep dive. If one is inadvertently held out more than the other (by pilot error or by failure of the hydraulic system) the augmentation diminishes in such a way to make the side slip less.

The drag device of the invention only requires an actuator force that is a small fraction of the force normally needed to operate a conventional drag device. While a smaller actuator force is one benefit of the invention, a larger surface with the same control force would open up opportunities never considered before, such as putting all of the weight of the air vehicle on the drag flaps so that a large airplane like the B-2 bomber can fly at its full speed straight down. In this manner, an aircraft could descend from high altitude to terrain-following-radar altitude in a time interval measured in seconds.

This invention is operable even if only on the top side of the wing. The application of the invention in the form of a top-only flap would be desirable to maintain a low radar cross section.

A primary feature, then, of the present invention is the provision of improved aerodynamic control apparatus used in combination with a wing of an aircraft. In the preferred embodiment, this invention is a split flap that mounts on the wing tips. However, in another embodiment a single piece drag flap can be applied to either top or bottom surface of the wing or any other surface of the aircraft Another feature of the present invention is the provision of such aerodynamic control apparatus in the form of an augmented drag flap pivotally mounted on any surface for coupled movement about mutually perpendicular first and second axes between a fully feathered position presenting minimal resistance to the airstream and a fully operative position presenting maximum resistance to the airstream.

An important feature of the present invention is that the coupled movement about mutually perpendicular first and second axes provides an augmenting force taken from the very drag force that is being created and given to the actuation force, thus making such control less taxing on the hydraulic system.

An alternate embodiment of the present invention is the provision of such aerodynamic control apparatus wherein such apparatus includes just one surface member and a transfer strut pivotally mounted to, and extending between, the aircraft structure and control surface member, with the control surface member being movable primarily about a first axis generally parallel to the roll axis of the aircraft when in the fully feathered position and simultaneously about the first axis and about a second axis generally parallel to the yaw axis of the aircraft when the control surface is intermediate the feathered position and the fully operative position.

Yet another feature of the present invention is the provision of such aerodynamic control apparatus which includes first and second control surface members, each having an operating surface, hinged about a common axis, wherein the first and second operating surfaces are contiguous and opposed when the drag flap mechanism is in the feathered position, the first and second operating surfaces defining therebetween an obtuse angle at the common axis when the drag flap mechanism is in the operative position.

Still a further feature of the present invention is the provision of such aerodynamic control apparatus so configured that the drag force is coupled into the actuation force so very large drag loads can be controlled by very small actuator forces.

Yet a further feature of the present invention is the provision of such aerodynamic control apparatus of the preferred embodiment (on the wing tips) where it can be used for yaw control and where in one configuration, utilizes an actuator to achieve movement between a fully feathered position presenting minimal resistance to the airstream and a fully operative position presenting maximum resistance to the airstream and, in another configuration, where the apparatus on both tips is slightly opened, operates between fully feathered and fully operative positions automatically in reaction to the airstream.

Still another feature of the present invention is the provision of such force augmented aerodynamic control apparatus in places on the wing balanced left and right, and operated together to impart a drag force on the entire aircraft to specifically address glide slope control and that because of the force augmentation modest hydraulic control actuators enable very steep cruising speed dives and even vertical dives by large aircraft such as bombers.

Still a further feature of the present invention is that the aerodynamic control apparatus can be used two ways in which, in one instance, the control surfaces of left and right drag flap mechanisms move independently toward the fully operative position and thereby operate to control the yaw angle of the aircraft and in which, in another instance, the control surfaces of the left and right drag flap mechanisms move in unison toward the fully operative position and thereby operate to impart drag to the entire aircraft. This is a failsafe drag suitable for use at high speed because of the side slip sensitive way the augmentation works. If both sides are deployed and the airstream isn't straight, augmentation on the offending side is automatically removed.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate two of the many embodiments of the invention, and together with the description, serve to explain the principles of the invention in general terms. Like numerals refer to like parts throughout the disclosure.

BRIEF DESCRIPTION OF THE DRAWINGS

FIG. 4 is a top plan view, similar to FIG. 3, illustrating the aerodynamic control apparatus in an intermediate position;

FIG. 5 is a top plan view, similar to FIG. 3, illustrating the aerodynamic control apparatus in a fully operative position;

FIG. 13 is a detail perspective view of another embodiment of the invention in which the aerodynamic control apparatus of the invention is in its fully feathered position flush with the upper surface of the wing of an aircraft;

FIG. 13A is an end elevation view of a control surface member illustrated in FIG. 13;

FIG. 14 is a detail perspective view, similar to FIG. 13 but without the aerodynamic control apparatus of the invention in its proper position so as to illustrate a cavity which it fills;

FIGS. 15, 16, and 17 are detail perspective views, similar to FIG. 13 but illustrating successive positions of the modified aerodynamic control apparatus of the invention;

FIG. 18 is a detail perspective view, certain parts being removed or illustrated in phantom, corresponding with FIG. 13, to illustrate the working mechanism of that embodiment of the invention;

FIG. 19 is a detail elevation view of the components illustrated in FIG. 18 as taken from an end of hinge plate 76;

FIG. 20 is a detail perspective view, certain parts being removed or illustrated in phantom, corresponding with FIG. 16, to illustrate an intermediate position of the working mechanism of that embodiment of the invention;

FIG. 21 is a detail elevation view of the components illustrated in FIG. 20 as taken from an end of hinge plate 76;

FIG. 22 is a detail perspective view, certain parts being removed or illustrated in phantom, corresponding with FIG. 17, to illustrate the fully operative position of the working mechanism of that embodiment of the invention;

FIG. 23 is a detail elevation view of the components illustrated in FIG. 22 as taken from an end of hinge plate 76.

DETAILED DESCRIPTION OF THE PREFERRED EMBODIMENTS

Figure 1:
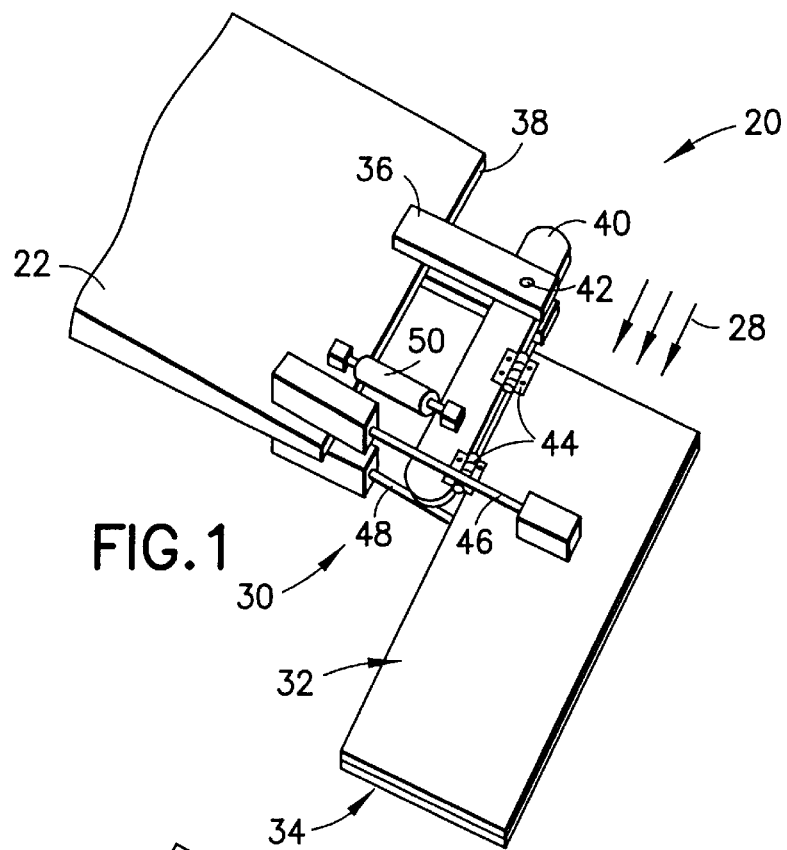
FIG. 1 is a detail perspective view illustrating aerodynamic control apparatus embodying the invention assuming a substantially fully feathered position.
Figure 2A:
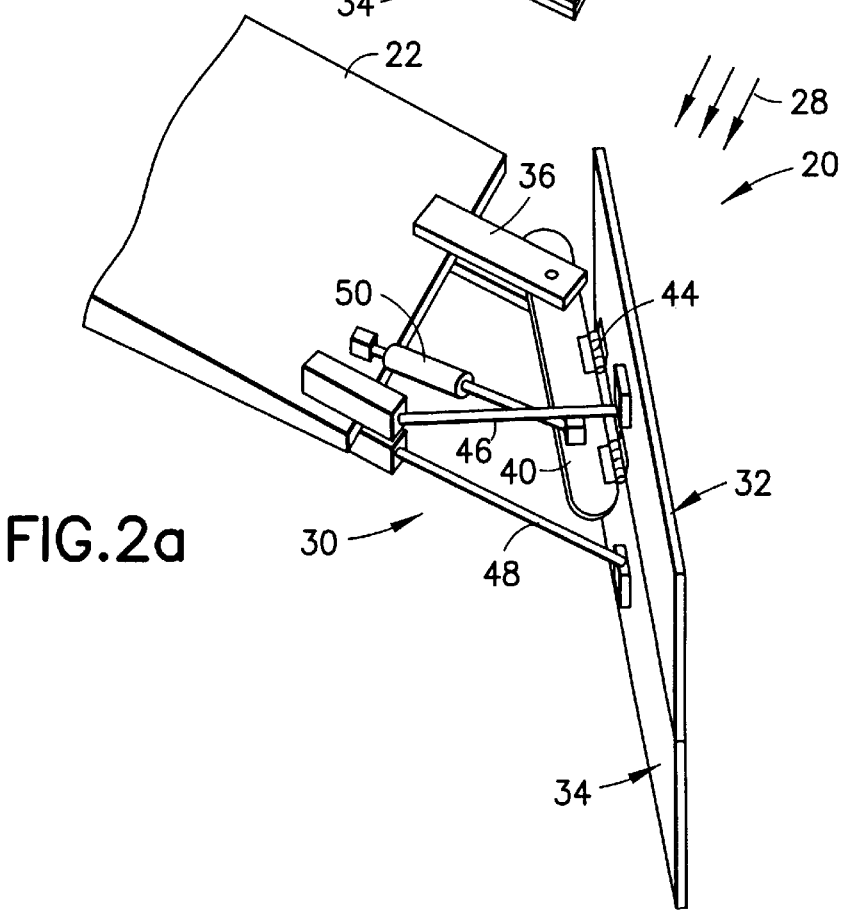
FIG. 2 is a detail perspective view, similar to FIG. 1, wherein the aerodynamic control apparatus embodying the invention assumes a fully operative position.
Figure 3:
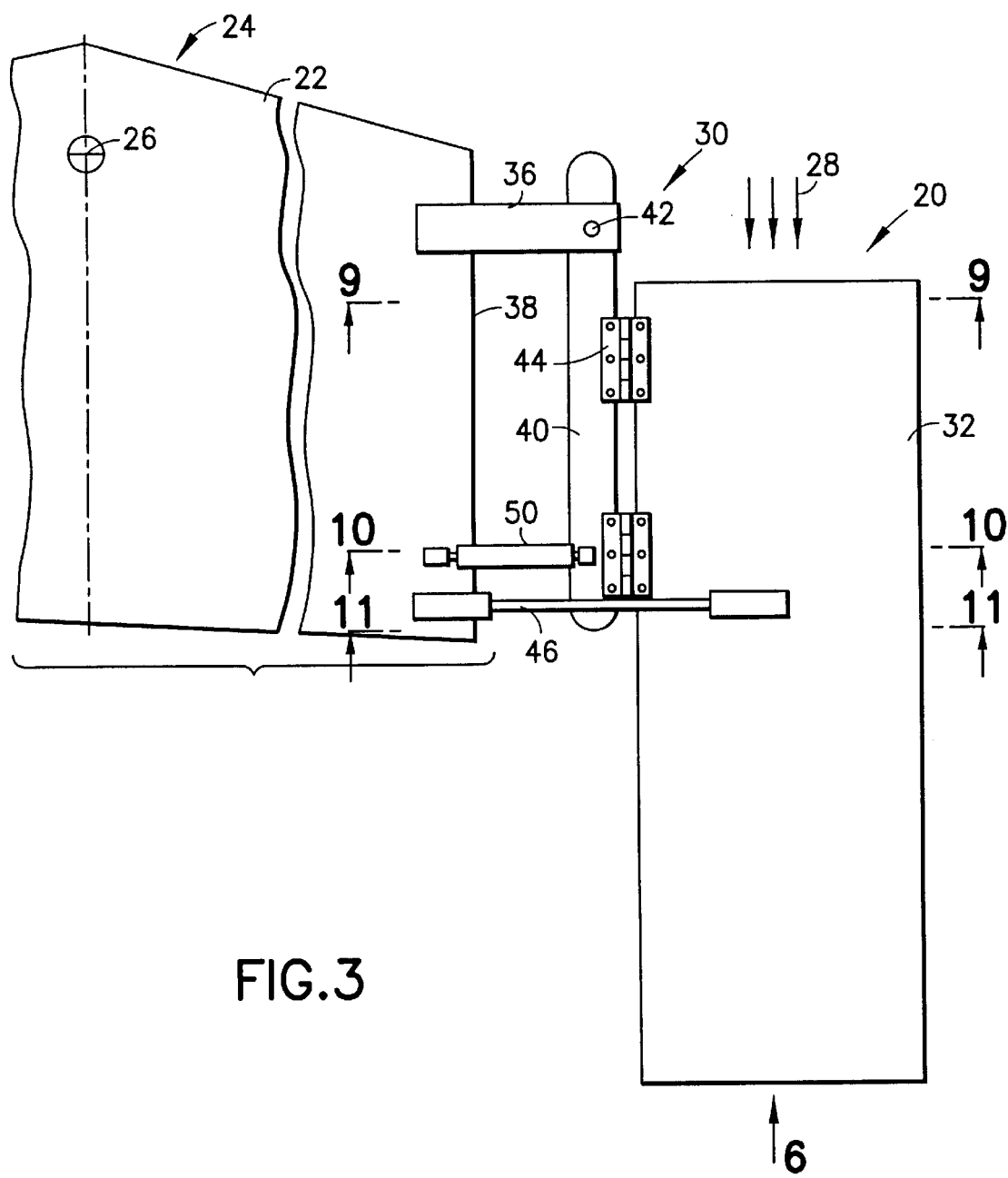
FIG. 3 is a top plan view of the aerodynamic control apparatus illustrated in FIG. 1.
Figure 6:
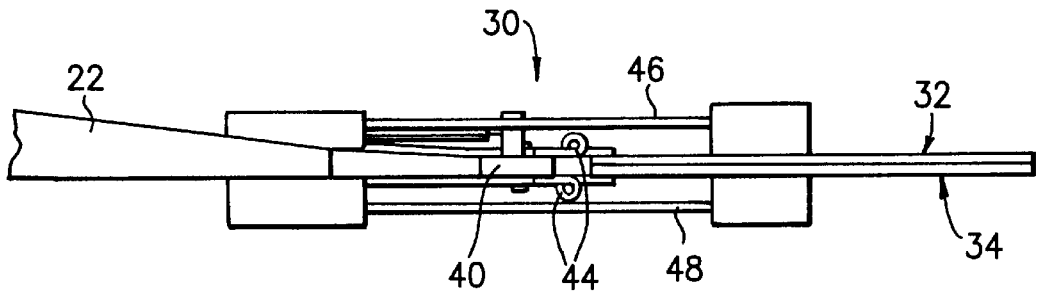
FIGS. 6, 7, and 8 are rear elevation views, respectively, of the aerodynamic control apparatus illustrated in FIGS. 3, 4, and 5.
Figure 7:
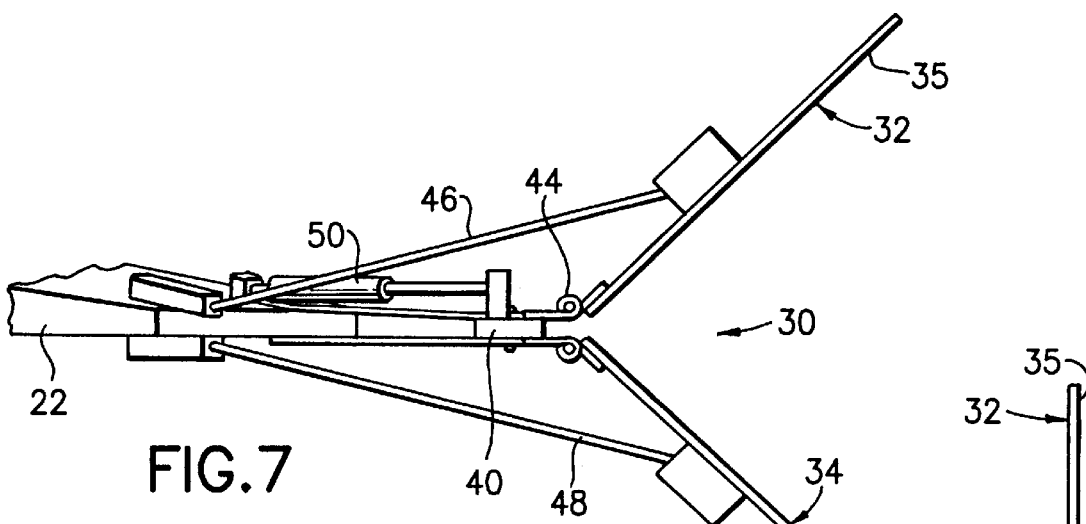
Figure 8:
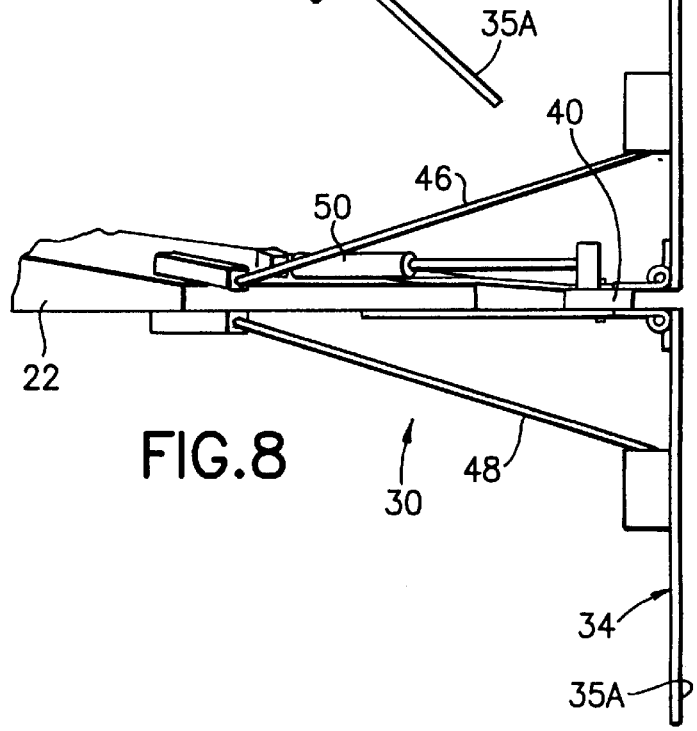
Figure 9:
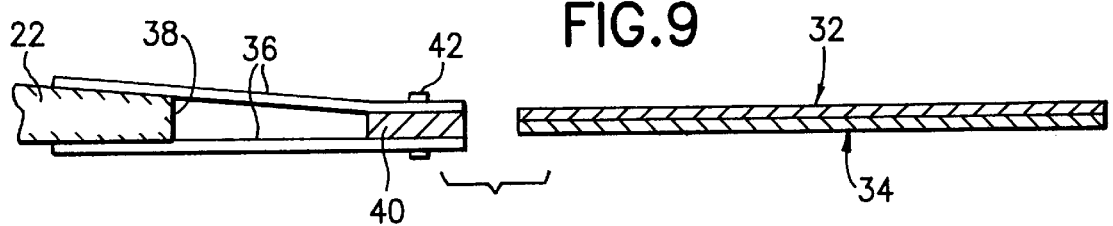
FIGS. 9, 10, and 11 are cross sectional views taken generally along lines 9—9, 10—10, and 11—11, respectively, in FIG. 3.
Figure 10:
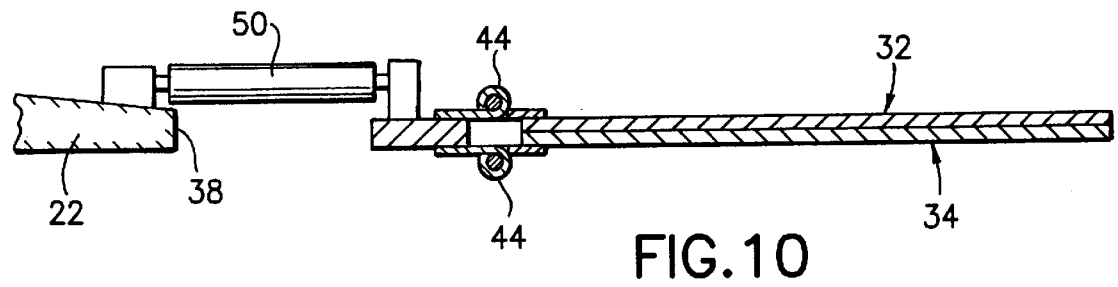
Figure 11:
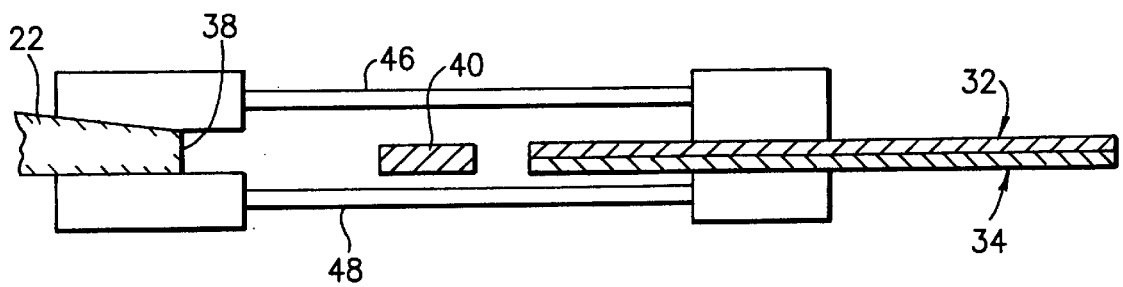

Turn now to the drawings and, initially, to FIGS. 1–12 which illustrate aerodynamic control apparatus 20 embodying the invention as it assumes different attitudes and as viewed from a number of different points of observation. The aerodynamic control apparatus 20 is intended for a wing 22 of an aircraft 24 which, in a customary manner, has a center of gravity 26 and is maneuverable about pitch, roll and yaw axes. The aircraft 22 may be of the flying wing variety or may be conventional with fuselage, wings and empennage, or may even be of a hybrid design blending the wing and fuselage. In any event, the aircraft 24 is subjected to an airstream as depicted by arrows 28.

The aerodynamic control apparatus 20 comprises a drag flap mechanism 30 which is illustrated to include a pair of control surface members, or flaps, 32, 34 which are pivotally mounted on the wing 22 for coupled movement about mutually perpendicular axes between a fully feathered position (FIGS. 1 and 6) presenting minimal resistance to the airstream through an intermediate position (FIGS. 4 and 7) and a fully operative position (FIGS. 2, 5 and 8) presenting maximum resistance to the airstream. It will be appreciated that the first and second control surface members 32, 34 have operating surfaces 35 and 35A that are contiguous and opposed when the drag flap mechanism 30 is in the feathered position and that they define between themselves an obtuse angle at their common axis when the drag flap mechanism is in the operative position. It will be further appreciated that there are instances in which it may be desirable for the drag flap mechanism 30 to utilize only a single control surface member and the invention is intended to encompass such a construction.

The drag flap mechanism 30 includes cantilevered bracket members 36 fixed to the wing 22 and extending beyond a tip end 38 of the wing. A hinge plate 40 is pivotally mounted on the bracket member for rotation about a pin 42 at a location spaced from the tip end of the wing and the control surface members 32, 34 are mutually attached to the hinge plate by means of hinges 44 for pivotal movement about their common axis. The axis defined by the hinges 44 is generally parallel to the roll axis of the aircraft 24 when the drag flap mechanism 30 assumes the fully feathered position and the axis of the pin 42 is generally parallel to the yaw axis of the aircraft.

Transfer struts 46 and 48 are pivotally mounted to, and extend between, the wing 22 and associated control surface members 32, 34. The transfer struts are mounted to the wing at a location distant from the bracket member 36 and are mounted, respectively, to the control surface members 32, 34 at locations spaced from the common axis, that is, the axis defined by the hinges 44.

The control surface members are therefore movable primarily about the axis defined by the hinges 44 when in the fully feathered position and simultaneously about that axis and the axis of the pin 42 when the control surface members are intermediate the feathered position and the fully operative position.

An actuator 50 may be provided for operation by the pilot of the aircraft 24 for moving the control surface members 32, 34 between the fully feathered and fully operative positions. To this end, the actuator is suitably, pivotally, attached to the wing 22 and to the hinge plate 40. When the actuator 50 is retracted, the drag flap mechanism 30 is in the fully feathered position and when the actuator is extended, the drag flap mechanism is in the fully operative position.

Figure 12:
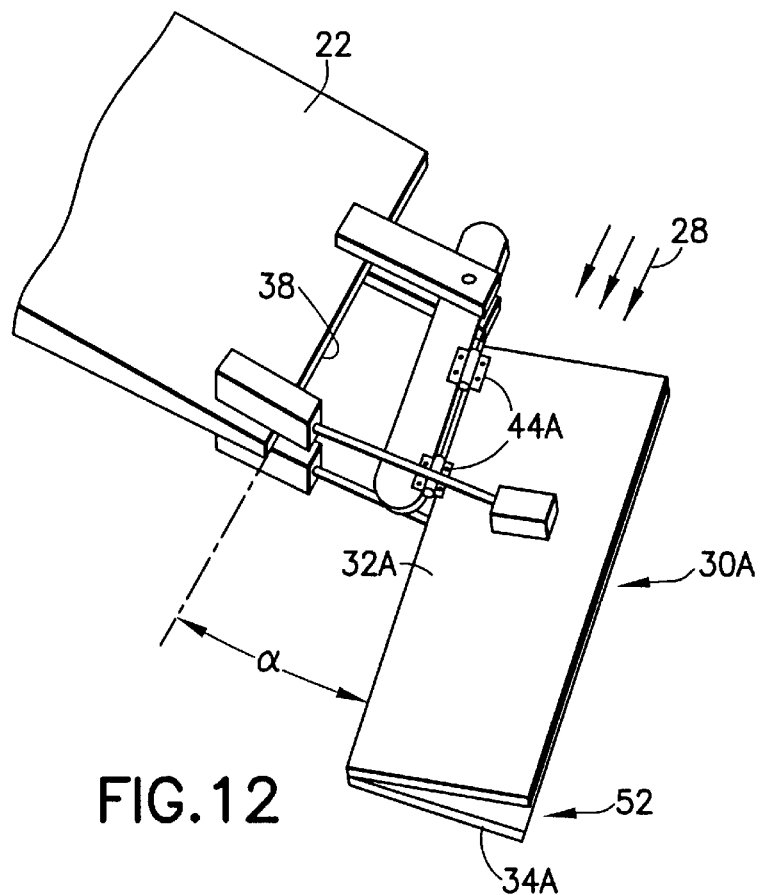
FIGS. 12 and 12A are perspective and top plan views, respectively, of another embodiment of the invention not utilizing an actuator.
Figure 12A:
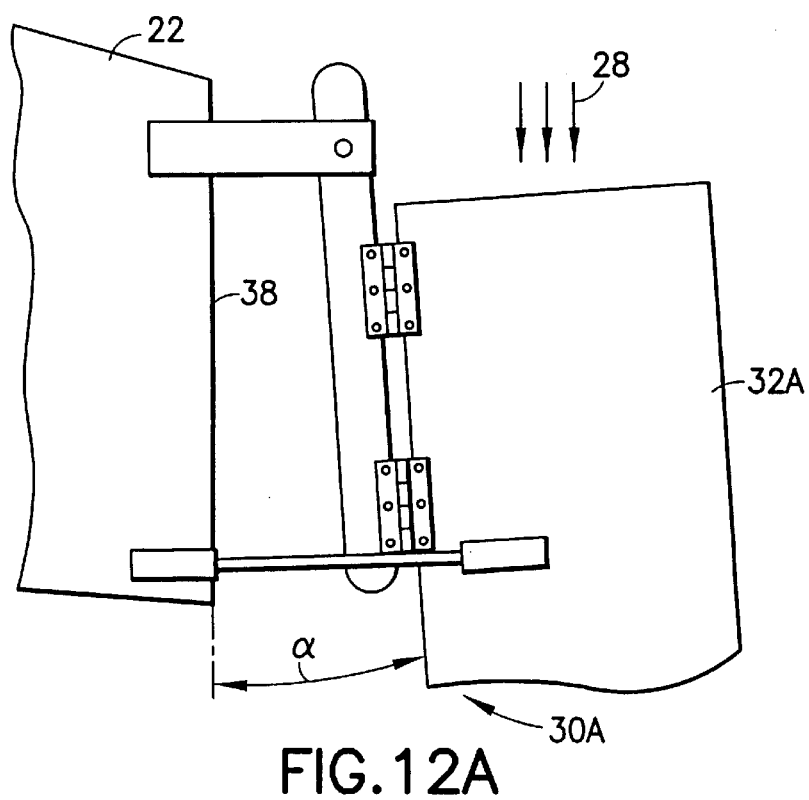

However, it is not necessary, for purposes of the invention, that the drag flap mechanism utilize an actuator. Indeed, such a construction lacking an actuator is illustrated in FIGS. 12 and 12A. Referring now to these figures and recalling the earlier explanation that if the force to open opposed control surface members 32A, 34A and the force to swing them out across the airstream 28 are sufficiently balanced, the mere presence of a skewed airstream is sufficient to open them. In this instance, the control surface members 32A, 32B must be canted at least to a small extent across the airstream 28 and, instead of being fully feathered, are parted slightly so as to define a pocket region 52 between them. This canted attitude is achieved if the axis defined by hinges 44A defines an angle α with respect to a longitudinal axis of the aircraft 24 as arbitrarily defined by an axis of the tip end 38 of the wing 22. In this instance, a drag flap mechanism 30A thus modified is a passive mechanism which works in the correcting sense. That is, the swinging of the control surface members 32A, 34A toward the airstream 28 opens the control surface members automatically thereby creating drag in the direction that will move the wing back to its original orientation. As the wing moves more and more into alignment with its original orientation, the control surface members close until they return to their initial orientation and the wing returns completely to its original orientation. This automatically operating mechanism may even replace a vertical fin if the aircraft has no fuselage, simplifying the construction and weight of the aircraft.

Turn now to FIGS. 13–23 which illustrate another embodiment of the invention. In this instance, modified aerodynamic control apparatus 60 comprises a modified drag flap mechanism 62 including a control surface member or flap 64 being pivotally mounted on the wing, inboard of the tip end 38. A particular benefit of this construction resides in the fact that the control surface member can extend from any surface of the aircraft. With it on the top of the wing, for example, it would not interfere with the landing gear of the aircraft 24 or with the undersurface of the wing. If positioned on top of the wing, it would also exhibit a smaller radar cross section.

As in the instance of the earlier described embodiment, the control surface member 64 is mounted for coupled movement about mutually perpendicular axes between a fully feathered position (FIGS. 13, 18 and 19) presenting minimal resistance to the airstream, intermediate positions (FIGS. 15, 16, 20, and 21), and a fully operative position (FIGS. 17, 22, and 23) presenting maximum resistance to the airstream. In the fully feathered position illustrated in FIG. 13, the control surface member 64 blends in with the upper surface of the wing 22 for maximum streamlining. FIG. 14 is provided merely to illustrate a cavity 66 inboard of the tip end 38 of the wing 22 into which the drag flap mechanism 64 is received. In the ensuing description of the drag flap mechanism 64, FIGS. 13, and 15–17 illustrate various orientations of the control surface member 64 while FIGS. 18–23 illustrate various orientations of the specific mechanism for operating the control surface member. FIGS. 19, 21 and 23 illustrate the drag flap mechanism from a moving point of view. It is looking along the hinge axis.

A transfer strut 68 of fixed length, as in the earlier described embodiment, is pivotally mounted to, and extends between, the wing 22 and the control surface member 64. The control surface member 64 is movable primarily about a first axis generally parallel to the roll axis of the aircraft when in the fully feathered position (see FIGS. 13, 18, 19) and simultaneously about the first axis and a second axis generally parallel to the yaw axis of the aircraft when the control surface is intermediate (see FIGS. 15, 16, 20, 21) the feathered position and the fully operative position.

The drag flap mechanism 62 is received within the cavity 66 located in an upper side of the wing and includes the control surface member 64 hinged as at 70 about the first axis. As seen in FIG. 13A, the control surface member 64 has an operating surface 72 which lies in a plane substantially parallel with the airstream (although actually disposed within the cavity 66) when the drag flap mechanism is in the feathered position contained substantially within the cavity and substantially faces the airstream when the drag flap mechanism is in the operative position extending substantially beyond the cavity.

The drag flap mechanism 62 further includes a support member 74 fixed to the wing 22 within the cavity 66. A hinge plate 76 is pivotally mounted on the support member 74 within the cavity 66 and, in turn, the control surface member 64 is hinged to the hinge plate by means of the hinge 70 for pivotal movement about the first axis.

As seen in any of FIGS. 18–23, the transfer strut 68 is mounted to the wing at a location distant from the support member 74 and the transfer strut is mounted to the control surface member at a location spaced from the first axis. An actuator 78 is suitably mounted on the wing for moving the control surface member 64 via the hinge plate 76 and an actuator rod 80.

Figure 24:
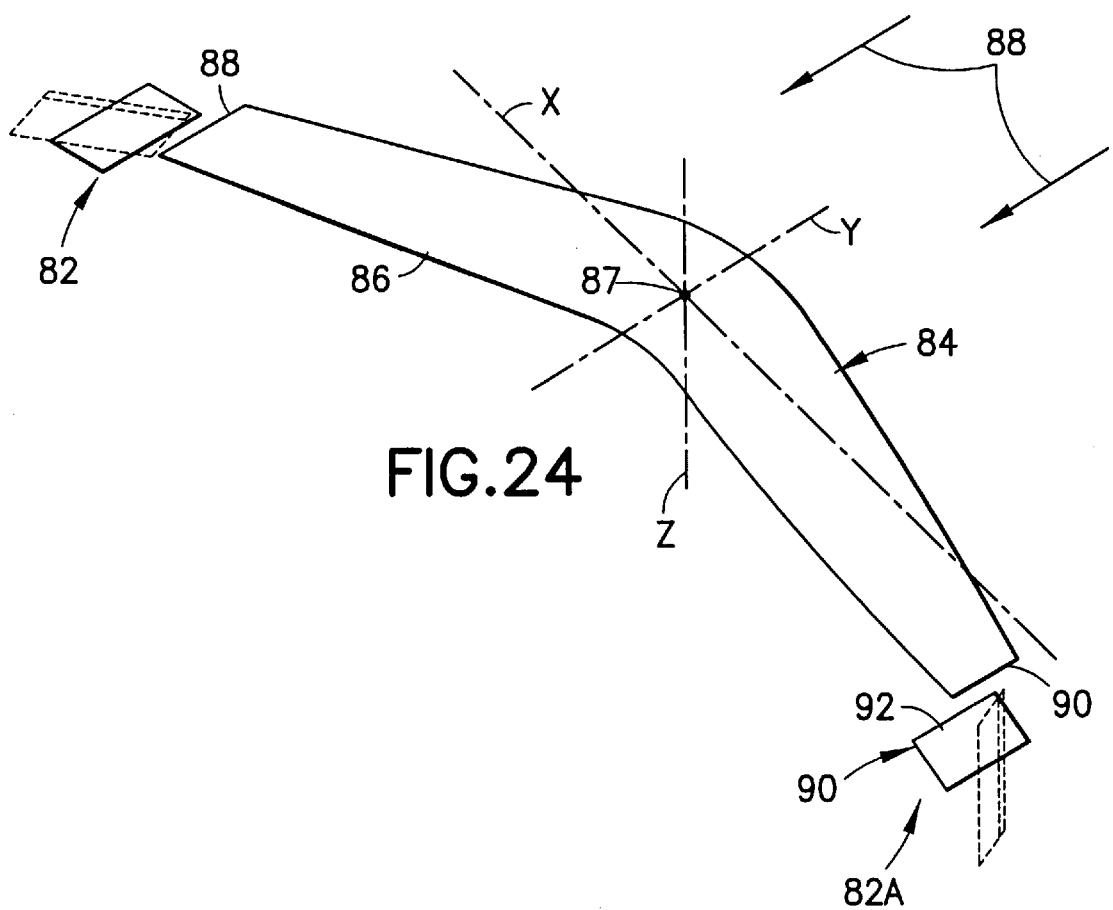
FIG. 24 is a diagrammatic perspective view illustrating a flying wing aircraft equipped with the preferred embodiment of the invention.

Yet another embodiment of the invention is illustrated in FIG. 24 which illustrates modified aerodynamic control apparatus 82, 82A for an aircraft 84 including a wing 86 having left and right tip ends, 88, 90, respectively. The aircraft 84 is depicted as having a center of gravity 87, pitch (x), roll (y), and yaw (z) axes, respectively, and subjected to an airstream indicated by arrows 88. The aerodynamic control apparatus 82, 82A on each tip end of the wing comprises a drag flap mechanism 90 having the construction an configuration of the previously described embodiments. To this end, each drag flap mechanism 90 includes at least one control surface member 92 being pivotally mounted adjacent to its associated tip end of the wing for coupled movement about mutually perpendicular first and second axes between a fully feathered position presenting minimal resistance to the airstream and a fully operative position presenting maximum resistance to the airstream. With this construction, if the control surface members of the left and right drag flap mechanisms are move independently, that is, one is moved to the fully operative position while the other remains fully feathered, then the drag flap mechanisms 90 operate to control the aircraft about the yaw axis z.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Aerodynamic control apparatus for creating drag on an aircraft subjected to an airstream, the control apparatus comprising:

a drag flap mechanism including:

at least one control surface member being pivotally mounted on the wing for coupled movement about mutually perpendicular first and second axes, the first axis being generally parallel to a roll axis of the aircraft, the second axis being generally parallel to a yaw axis of the aircraft, the at least one control member being movable between a fully feathered position presenting minimal resistance to the airstream and a fully operative position presenting maximum resistance to the airstream;

a hinge plate pivotable about a hinge plate pivot axis parallel to the yaw axis;

a hinge pivotally mounting the hinge plate on the control surface member; and an actuator for moving said hinge plate from a position parallel with the airstream to a position away from the aircraft centerline.

2. Aerodynamic control apparatus as set forth in claim 1 wherein said drag flap mechanism includes;
   a transfer strut pivotally mounted to and extending between the aircraft structure and the control surface member to constrain the motion of the control-surface-member to movement about the mutually perpendicular first and second axes such that there is a transfer of some of the drag force from the control surface member to the pivoting hinge plate.

3. Aerodynamic control apparatus as set forth in claim 2 wherein the transfer strut has one of its ends connected to the control surface member at a location spaced from the hinge plate pivot axis; and
   wherein said transfer strut has its other end connected to the aircraft structure at the location spaced from the pivot of the hinge plate and that by varying these distances a balance of forces can be achieved which augments the force of the actuation to any amount desired.

4. Airfoil control apparatus as set forth in claim 3 wherein the wing has a pair of spaced apart tips;
   wherein the drag flap mechanism is mounted on each of the tip ends and includes:
      a bracket member fixed to each tip end and extending beyond each tip end;
      said hinge plate being pivotally mounted on the bracket member at a location spaced from each tip end.

5. Airfoil control apparatus as set forth in claim 4 wherein said drag flap mechanism includes first and second control surface members hinged about a common axis;
   wherein said first control surface member has a first operating surface;
   wherein said second control surface member has a second operating surface; and
   wherein said first and second operating surfaces are contiguous and opposed when said drag flap mechanism is in the feathered position, said first and second operating surfaces defining therebetween an obtuse angle at the common axis when said drag flap mechanism is in the operative position.

6. Aerodynamic control apparatus as set forth in claim 3 wherein said drag flap mechanism is received within a cavity located in the aircraft structure and includes a control surface member hinged about the first axis; and
   wherein said transfer strut means includes:
      a transfer strut pivotally mounted to and extending between the aircraft structure and said control surface member.

7. Aerodynamic control apparatus as set forth in claim 6 wherein the drag flap mechanism includes:
   a support member fixed to the aircraft structure within the cavity; and
   a hinge plate pivotally mounted on the support member within the cavity, the control surface member being hinged to the hinge plate for pivotal movement about the first axis so as to lie flat against the aircraft structure when in the fully feathered position and being open and in the airstream when in the operative position.

8. Aerodynamic control apparatus as set forth in claim 4 wherein the drag flap mechanisms are disposed laterally on opposite sides of the aircraft centerline where the distance between them allows a yaw force to be acted on the aircraft when used independently and when,
   within each drag flap mechanism, the force of actuation is completely balanced by the force of opening, directional control can be obtained without actuation force in a process described as follows:
      the control-surface-members are closed and opened by augmentation alone when the direction of the airstream changes, providing a passive stabilizing force which gets larger when the drag forces increase on both sides in a way that is analogous to a vertical stabilizer that gets larger when the vehicle is decelerating.

9. Aerodynamic control apparatus as set forth in claim 8 wherein said drag flap mechanisms are operable in unison to achieve uniform drag control glide slope where the slope is nearly vertical (dive brakes) wherein
   the advantage of augmentation can be realized in increased safety because of the self straightening nature allowed by the removal of the augmenting force when there is side slip.

10. In combination with a wing of an aircraft having structure and including a wing and having a center of gravity, pitch, roll and yaw axes, and subjected to an airstream, aerodynamic control apparatus comprising:
   a drag flap mechanism including:
      at least one control surface member being pivotally mounted on said wing for coupled movement about mutually perpendicular first and second axes, the first axis being generally parallel to the roll axis of the aircraft, the second axis being generally parallel to the yaw axis of the aircraft, and the at least one control surface member being movable between a fully feathered position presenting minimal resistance to the airstream and fully operative position presenting maximum resistance to the airstream;
      a hinge plate pivotable about a hinge plate pivot axis parallel to the yaw axis;
      a hinge pivotally mounting the hinge plate on the control surface member and an actuator for moving said hinge plate from a position parallel with the airstream to a position away from the aircraft centerline.

* * * * *